US010561052B2

(12) United States Patent
Barrick et al.

(10) Patent No.: US 10,561,052 B2
(45) Date of Patent: Feb. 18, 2020

(54) AUTOMATIC FORE/AFT LEVELING TRIM FUNCTION IN A TOWABLE TILLAGE IMPLEMENT

(71) Applicant: CNH Industrial Canada, Ltd., Saskatoon (CA)

(72) Inventors: Christopher Barrick, Morton, IL (US); John Endsley, Washington, IL (US); Timothy R. Blunier, Danvers, IL (US); James W. Henry, Saskatoon (CA); Tracey Meiners, Mackinaw, IL (US); Klint Peterson, Mackinaw, IL (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 333 days.

(21) Appl. No.: 15/496,374

(22) Filed: Apr. 25, 2017

(65) Prior Publication Data

US 2018/0303022 A1    Oct. 25, 2018

(51) Int. Cl.
*A01B 63/22*    (2006.01)
*A01B 35/32*    (2006.01)
*A01B 79/00*    (2006.01)
*A01B 76/00*    (2006.01)
*A01B 73/04*    (2006.01)

(52) U.S. Cl.
CPC .............. *A01B 63/22* (2013.01); *A01B 35/32* (2013.01); *A01B 76/00* (2013.01); *A01B 79/005* (2013.01); *A01B 73/044* (2013.01)

(58) Field of Classification Search
CPC ....... A01B 63/22; A01B 35/32; A01B 73/044; A01B 76/00; A01B 79/005
See application file for complete search history.

(56) References Cited

U.S. PATENT DOCUMENTS

| 4,186,806 A | 2/1980 | Ward |
| 4,450,915 A | 5/1984 | DeHaai |
| 4,600,060 A | 7/1986 | Winter et al. |

(Continued)

FOREIGN PATENT DOCUMENTS

| JP | H08168301 A | 7/1996 |
| JP | 2006314208 A | 11/2006 |

(Continued)

OTHER PUBLICATIONS

EP 18166475.6, Extended European Search Report dated Sep. 28, 2018, 6 pages.

(Continued)

*Primary Examiner* — Jamie L McGowan
(74) *Attorney, Agent, or Firm* — Rebecca L. Henkel; Rickard K. DeMille

(57) ABSTRACT

A system, apparatus and method for adjusting fore/aft level trim of the frame of a towed agricultural tillage implement utilize an electronic control unit that receives an input signal indicative of a desired depth of penetration of tillage tools operatively attached to the front and rear of the implement frame, and automatically computes a desired for/aft trim angle as a function of the desired depth input, and then adjusts the fore/aft trim of the implement frame by titling the frame toward the front or rear of the frame in accordance with the desired fore/aft trim angle computed from the desired depth input signal.

14 Claims, 5 Drawing Sheets

(56) References Cited

U.S. PATENT DOCUMENTS

| | | | |
|---|---|---|---|
| 4,625,809 A * | 12/1986 | Moynihan | A01B 35/18 172/178 |
| 4,703,810 A * | 11/1987 | Meiners | A01B 49/02 172/178 |
| 4,807,131 A * | 2/1989 | Clegg | E02F 3/842 172/4.5 |
| 5,590,721 A * | 1/1997 | Van Mill | A01B 49/027 172/138 |
| 5,653,292 A * | 8/1997 | Ptacek | A01B 63/114 172/239 |
| 5,957,218 A | 9/1999 | Noonan et al. | |
| 6,070,673 A | 6/2000 | Wendte | |
| 6,076,611 A * | 6/2000 | Rozendaal | A01B 63/22 172/2 |
| 6,144,910 A | 11/2000 | Scarlett et al. | |
| 6,216,794 B1 | 4/2001 | Buchl | |
| 6,557,646 B1 * | 5/2003 | Hurtis | A01B 21/083 172/156 |
| 6,612,375 B2 | 9/2003 | Rogala | |
| 7,017,675 B2 * | 3/2006 | Ankenman | A01B 49/02 172/142 |
| 7,063,167 B1 | 6/2006 | Staszak et al. | |
| 8,047,299 B2 * | 11/2011 | Hurtis | A01B 63/32 172/140 |
| 8,160,784 B2 | 4/2012 | Fukumoto | |
| 8,573,319 B1 * | 11/2013 | Casper | A01B 63/114 172/4 |
| 8,649,930 B2 | 2/2014 | Reeve et al. | |
| 8,657,023 B2 * | 2/2014 | Casper | A01B 63/111 172/145 |
| 8,746,361 B2 | 6/2014 | Hake et al. | |
| 8,751,114 B2 | 6/2014 | Filla | |
| 8,862,339 B2 | 10/2014 | Henry et al. | |
| 9,326,444 B2 | 5/2016 | Bonefas | |
| 9,433,142 B2 | 9/2016 | Bergen et al. | |
| 9,497,897 B2 * | 11/2016 | Hennes | A01B 21/083 |
| 9,554,504 B2 * | 1/2017 | Houck | A01C 7/203 |
| 10,064,322 B2 * | 9/2018 | Janelle | A01B 5/04 |
| 2008/0195268 A1 | 8/2008 | Sapilewski et al. | |
| 2015/0053439 A1 | 2/2015 | Ohnsat | |
| 2015/0230391 A1 | 8/2015 | Houck | |
| 2016/0029547 A1 | 2/2016 | Casper et al. | |
| 2016/0262300 A1 | 9/2016 | Gates | |
| 2017/0079194 A1 | 3/2017 | Janelle et al. | |

FOREIGN PATENT DOCUMENTS

| | | |
|---|---|---|
| JP | 2006314209 A | 11/2006 |
| JP | 2007000087 A | 1/2007 |
| WO | 2010/074633 A1 | 7/2010 |
| WO | 2013026661 A1 | 2/2013 |
| WO | 2015019942 A1 | 2/2015 |

OTHER PUBLICATIONS

Xie, Bin. Li, Hao, Zhu, Zhongxiang, Mao, Enrong; "Measuring Tillage Depth for Tractor Impiement Automatic Using Inclinometer"; Transactions of the Chinese Society of Agricultural Engineering/Nongye Congcheng Xuebao, 29.4 (20130200); 15-21.

"Machinery Manufacturers are Set to Unveil a Host of New and Upgraded Cultivations, Seeding, Harvesting and Control Equipment at the Cereals Event. Peter Hill Catalogued the Highlights" Farmers Weekly 757 (May 25, 2012): NA.

Katayama, Y., Kisaka, H., Kinoshita, M., Machida, S.; "Automatic Implement Tilt Control for Kubota Agricultural Tractors"; International Congress on Transportation Electronics Proceedings (Cat. No. 84CH1988-5): X 1-11; 365; IEEE (1984).

* cited by examiner

AUTOMATIC FORE/AFT LEVELING TRIM FUNCTION IN A TOWABLE TILLAGE IMPLEMENT

FIELD OF THE INVENTION

This invention relates generally to a towable agricultural tillage implement, and more particularly to automatic trim adjustments to the fore/aft leveling of such an implement, to thereby facilitate operation of the towable tillage implement and provide improved seedbed conditions.

BACKGROUND OF THE INVENTION

Modern farming practices often utilize towable agricultural tillage implements to prepare a seedbed providing optimal conditions for subsequent planting of seed in the seedbed, proper germination and growth of the seed, and conservation of the soil in and below the seedbed. Such implements are configured to provide a seedbed having a number of desirable conditions, including a uniform controlled depth, a flat and smooth floor at the bottom of the seedbed, and a relatively even surface finish.

To achieve these desired seedbed conditions, a number of factors must be taken into account in the design and set-up of the implement so that it will operate properly with a given towing vehicle operating at a desired speed. Some of these factors are interdependent, and to date have required iterative adjustments to get the implement set just right for producing the desired seedbed conditions.

Currently an operator must generally make some adjustments manually to the implement, using turnbuckles or manually operated hydraulic controls to get the implement properly set up for producing the desired seedbed conditions. The necessity for such manual adjustments result in undesirable delay and inconvenience for the operator. This is particularly the case where such adjustments must be partially made by person standing on the ground, rather than in the cab, or through the efforts of two people, one on the ground and one in the cab of the towing vehicle.

It is common for such towable agricultural tillage implements to have front and rear rows, or gangs, of tillage tools attached at front and rear ends of a frame of the towable implement. In such implements, adjustment of the depth of penetration of the front and rear rows of tillage tools is affected by the fore/aft level condition of the frame. For some types of implements and certain operating conditions, having the frame oriented substantially horizontally level with the ground under the implement results in production of optimal desired seedbed conditions.

In the past, there have been a number of approaches utilized for setting the fore/aft level of the frame generally horizontal to the ground under the implement, and for maintaining the frame as level as possible during operation of the implement. Such leveling was accomplished typically by manual adjustments made during initial set-up of the machine for operation at a given depth of penetration of the tillage tools. If tillage depth was increased or decreased, another iterative manual setup was often required to reset the fore/aft level of the frame.

Some prior and current systems utilize manually operable turnbuckles to adjust the levelness of the frame. These adjustments are typically cumbersome and time consuming. Other current systems utilize a manually operable hydraulic frame-leveling cylinder to adjust the fore/aft levelness of the frame. Systems using a manually operable frame-leveling cylinder offer considerable advantage in convenience and speed of adjustment. But even where such systems are designed such that the leveling cylinder can be controlled by the operator from the seat of the towing vehicle, making the required manual adjustments consumes more time than is desirable, and introduces unwanted opportunity for adjustment error.

Some prior approaches have attempted to automate the process of maintaining the frame in a substantially level attitude throughout a range of operating depths of the implement. Some of these approaches utilize a mechanical linkage arrangement that is adjusted manually during initial set-up of the implement to place the frame in a level condition. The linkage is configured such that, as the depth of the implement is adjusted through a limited range of operating depths, the linkage maintains the frame in a substantially level condition.

In another prior approach to automating fore/aft leveling of an implement frame, a mechanical leveling linkage includes one or more fore/aft leveling hydraulic cylinders that are plumbed into a hydraulic circuit used to set the tillage depth in such a manner that the fore/aft leveling cylinders automatically adjust the levelness of the frame to maintain the frame level as the tillage depth is changed, throughout a range of operating depths. Levelness is set by adjustments to the mechanical linkage during an initial set-up procedure. The fore/aft leveling cylinders then operate automatically within the leveling linkage to maintain the frame in a level position as the tillage depth is changed. This automatic operation of the leveling cylinders is achieved by selectively sizing the fluid capacity and flow characteristics of the fore/aft leveling cylinders, or by providing a flow divider/combiner, to maintain a fixed ratio of flow of hydraulic fluid to the fore/aft cylinders in proportion to the flow of hydraulic fluid in the tillage depth setting circuit, to thereby cause the fore/aft leveling cylinders to adjust the leveling linkage in a manner maintaining the frame in a level position. While this system provides considerable improvement over previous approaches it still requires an initial manual setup that is more cumbersome than is desirable, to properly complete initial adjustment of the leveling linkage. This approach also is limited to providing and maintaining a single, fixed adjustment of frame fore/aft level orientation that cannot be altered without repeating the set-up procedure. Such an approach also requires precise sizing of the hydraulic components for proper operation.

While all of the above approaches to setting and maintaining the fore/aft level of an implement frame have been used with varying degrees of success in the past, they are more cumbersome and time consuming than is desirable. Further improvements are desirable to simplify frame leveling adjustments through reducing manual adjustment, operator involvement, and allowing any adjustments related to leveling to be conveniently carried out while the implement is in the field without resorting to complex readjustments when depth of operation is changed.

In addition, experience has shown that maintaining a perfectly level frame orientation throughout the range of operating depths of a towable tillage implement may not always result in optimum seedbed preparation and operation of the implement. Experience has shown that sometimes optimum performance requires that the frame be tilted from a substantially level frame position. Optimal performance sometimes requires that the frame be tilted to a trim angle other than level. The degree of such tilting or trim angle that is desirable for achieving a desired seedbed condition may be depth dependent, such that, as depth of tillage changes throughout the operating depth range of the implement, the trim angle needs to change to a greater or lesser degree of optimal tilt as a function of the tillage depth.

For example, in some types of implements, such as disk-type vertical tillage implements, optimal performance is sometimes achieved when the frame is tilted, or trimmed, slightly toward the front or the rear rather than being substantially horizontally level. In such implements, interaction of the tilled soil discharged by the leading, (i.e. front), gangs of tillage tools with the trailing, (i.e. rear), gangs of tillage tools can result in a less than optimal seedbed surface having ridges and valleys that would hamper proper operation of seed planting equipment. It is known, in such instances, that making small adjustments to the fore/aft trim of the tillage implement can correct this condition and eliminate the ridges and valleys in the surface finish of the seedbed. The prior and current approaches described above to maintaining levelness of the frame generally do not lend themselves to conveniently making such trim adjustments.

The degree of tilt or trim required is typically related to the desired depth of the seedbed. Seedbed depth is consequently controlled by the depth of penetration of the front and rear tillage tools. With prior approaches, a desired smooth seedbed surface is often achieved only by an iterative process of: first, adjusting fore/aft trim to an essentially level position for uniform depth of penetration of the front and rear tillage tools, as measured just behind the blades of the front and rear tillage tools; second, adjusting the depth of penetration, verified again by measurement behind the blades of the front and rear tillage tools; and then, trimming the fore/aft level to tilt the frame to the front or rear to achieve the desired seedbed surface finish for the desired depth of penetration. Currently, some or all of these adjustment steps must be performed by the operator manually while standing on the ground with the implement, rather than totally from the cab or seat of the towing vehicle.

It is desirable, therefore, to provide an improved system, apparatus and method for adjusting the fore/aft level trim of the frame of a towed agricultural tillage implement. It is further desirable that such improvements include provisions for making these adjustments automatically, and without the necessity of the operator having to dismount from the towing vehicle to accomplish the required adjustments from the ground.

SUMMARY OF THE INVENTION

The invention provides an improved system, apparatus and method for adjusting fore/aft level trim of the frame of a towable agricultural implement, through the use of an electronic control unit that receives an input signal indicative of a desired depth of penetration of the tillage tools and automatically computes and adjusts the fore/aft tilt of the frame as a function of the desired depth input signal.

In one form of the invention, a towable tillage implement having an automatic fore/aft level trim apparatus is provided, for engaging and acting upon a ground surface under the implement. The tillage implement includes a frame defining forward and aft ends and upper and lower surfaces of the frame. Front and rear tillage tools are attached respectively to the forward and aft ends of the frame. Ground support wheels are operatively attached to the frame by a depth adjusting arrangement that includes a depth adjustment actuator for adjusting a depth of penetration of the front and rear tillage tools below the ground surface. The implement also includes a hitch having an aft end pivotably attached to the forward end of the frame and a distal, or free, end adapted for attachment at a drawbar height to the drawbar of a towing vehicle. The aft end of the hitch is operatively attached to the frame in a manner allowing the frame to be tilted along a fore/aft axis to adjust fore/aft trim of the frame.

The implement also includes a fore/aft trim angle adjusting actuator operatively attached between the hitch and the frame for tilting the frame at a trim angle along the fore/aft axis. A trim angle adjustment power source is operatively attached to the fore/aft trim actuator for driving the trim actuator to adjust the trim angle. A trim angle position sensor is operatively attached between the hitch and the frame for indicating a present value of the fore/aft trim angle, and providing an electrical output in the form of a present trim angle signal that is indicative of the present fore/aft trim angle of the frame. In some forms of the invention, the trim angle position sensor detects a present value of a pivot angle between the frame and the hitch that is indicative of the present value of the fore/aft trim angle of the frame, and generates an electrical output in the form of a present trim angle signal that is indicative of the present fore/aft trim angle of the frame.

A depth sensor is operatively attached to the implement for indicating a present depth of penetration of at least one of the front and rear tillage tools, and providing an electrical output in the form of a present depth signal indicative of the present depth of penetration of the at least one tillage tool.

A control unit is operatively connected to the depth and the trim angle sensors respectively for receiving the electrical present depth and present trim angle signals from the depth sensor and the trim angle sensor. The control unit is also operatively connected to the trim angle adjustment power source to provide control of the trim angle adjustment power source for selectively driving the trim angle actuator to tilt the frame along the fore/aft axis to thereby change the present fore/aft trim angle of the frame. The control unit is further configured for receiving a desired depth input and controlling the trim angle actuator to provide a desired fore/aft trim angle of the frame corresponding to the desired depth input signal.

In some forms of an implement, according to the invention, the control unit selects a predetermined trim angle corresponding to the desired seedbed depth input and controls the trim angle actuator power source using the predetermined trim angle. In other forms of the invention, the control unit of the implement computes a desired trim angle corresponding to the desired depth input, and controls the trim angle actuator power source using the computed trim angle. In yet other forms of an implement, according to the invention, the desired depth input is an incremental adjustment a present depth of penetration.

In some forms of an implement, according to the invention, the trim angle adjusting actuator is a hydraulic cylinder, and the trim angle adjusting power source is an electrically controlled hydraulic power source. The hydraulic cylinder may define a present cylinder stroke, and the trim angle position sensor may indicate the present trim angle by detecting a present absolute position of the present cylinder stroke. In other forms of the invention, the trim angle adjusting actuator may be an electrically driven linear actuator, and the trim angle adjusting power source is an electrical power source. The electrically driven linear actuator may define a present stroke length thereof, and the trim angle position sensor may indicate the present trim angle by detecting a present absolute position of the present linear actuator stroke.

In another form of the invention, a system for adjusting the fore/aft trim of a towed tillage implement, such as the implement described above, is provided. The fore/aft trim adjustment system includes a fore/aft trim angle adjusting actuator operatively attached between the hitch and the frame for tilting the frame at a trim angle along the fore/aft axis. A trim angle adjustment power source is operatively attached to the fore/aft trim actuator for driving the trim actuator to adjust the trim angle, and a trim angle position sensor operatively attached between the hitch and the frame for indicating a present value of the fore/aft trim angle, and providing an electrical output in the form of a present trim angle signal indicative of the present fore/aft trim angle of the frame. The system also includes a depth sensor operatively attached to the implement ter indicating a present depth of penetration of at least one of the front and rear tillage tools, and providing an electrical output in the form of a present depth signal indicative of the present depth of penetration of the at least one tillage tool.

The system also includes a control unit operatively connected to the depth sensor and the trim angle sensors for respectively receiving the electrical present depth and present trim angle signals from the depth and trim angle sensors. The control unit is also operatively connected to the trim angle adjustment power source to provide control of the power source for selectively driving the trim angle actuator to tilt the frame along the fore/aft axis, to thereby change the present fore/aft trim angle of the frame. The control unit of the system for adjusting fore/aft trim is further configured for receiving a desired depth input and controlling the trim angle actuator to provide a desired fore/aft trim angle of the frame corresponding to the desired depth input signal.

In some forms of an implement, according to the invention, the control unit selects a predetermined trim angle corresponding to the desired seedbed depth input and controls the trim angle actuator power source using the predetermined trim angle. In other forms of the invention, the control unit of the implement computes a desired trim angle corresponding to the desired depth input and controls the trim angle actuator power source using the computed trim angle. In yet other forms of an implement, according to the invention, the desired depth input is an incremental adjustment to a present depth of penetration.

In some forms of a system according to the invention, for adjusting the fore/aft trim of an implement, the trim angle adjusting actuator is a hydraulic cylinder, and the trim angle adjusting power source is an electrically controlled hydraulic power source. The hydraulic cylinder may define a present cylinder stroke, and the trim angle position sensor may indicate the present trim angle by detecting a present absolute position of the present cylinder stroke. In other forms of the invention, the trim angle adjusting actuator may be an electrically driven linear actuator, and the trim angle adjusting power source is an electrical power source. The electrically driven linear actuator may define a present stroke length thereof, and the trim angle position sensor may indicate the present trim angle by detecting a present absolute position of the present linear actuator stroke.

In another form of the invention, a method is provided for adjusting the fore/aft trim of a towed tillage implement using a fore/aft trim adjustment system, such as the implement and system according to aspects of the invention described above. In one form of the invention, a method for adjusting the fore/aft trim of a towed implement frame includes automatically tilting the frame in a fore/aft direction in response to a remotely generated signal computed as a function of a desired depth input and a present fore/aft trim angle of the frame.

A method, according to the invention may include the steps of: operatively attaching a fore/aft trim angle adjusting actuator between the hitch and the frame for tilting the frame at a trim angle along the fore/aft axis; operatively attaching a trim angle adjustment power source to the fore/aft trim actuator for driving; the trim actuator to adjust the trim angle; operatively attaching a trim angle position sensor between the hitch and the frame for indicating a present value of the fore/aft trim angle, and providing an electrical output in the form of a present trim angle signal indicative of the present fore/aft trim angle of the frame; operatively attaching a depth sensor to the implement for indicating a present depth of penetration of at least one of the front and rear tillage tools, and providing an electrical output in the form of a present depth signal indicative of the present depth of penetration of the at least one tillage tool; and, operatively connecting a control unit to the depth sensor and the trim angle sensor for respectively receiving the electrical present depth and present trim angle signals therefrom. The method may further include the additional steps of: operatively connecting the control unit to the trim angle adjustment power source to provide control of the trim angle power source to cause the power source to selectively drive the trim angle actuator to tilt the frame along the fore/aft axis, and to thereby change the present fore/aft trim angle of the frame; receiving a desired depth input at the control unit; and controlling the trim angle actuator to provide a desired fore/aft trim angle of the frame corresponding to the desired depth input signal.

Some forms of a method according to the invention may include selecting a predetermined desired trim angle corresponding to the desired depth input, and automatically tilting the frame to the predetermined desired trim angle corresponding to the desired depth input. Some forms of a method according to the invention may include computing a desired trim angle corresponding to the desired depth input and automatically tilting the frame to the computed trim angle. In some forms of a method, according to the invention, where the control unit computes a desired trim angle, and the present depth of penetration of tillage tools of the implement is known, and the desired depth input is an indication of a desired incremental adjustment to the present depth of penetration of the implement, the method may include computing a desired trim angle corresponding to the desired depth input incremental adjustment and automatically tilting the frame to the computed trim angle.

Some forms of the invention may include receiving the desired depth input from a location remote from the towable tillage implement. In some forms of the invention, the inputs from the operator, and functionality of the control unit may utilize aspects of modern farm equipment, such as an ISOBUS, or other applicable technology such that the operator may utilize the invention for automatically adjusting fore/aft trim of a towable tillage implement while the operator remains positioned in the cab of the towing vehicle.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
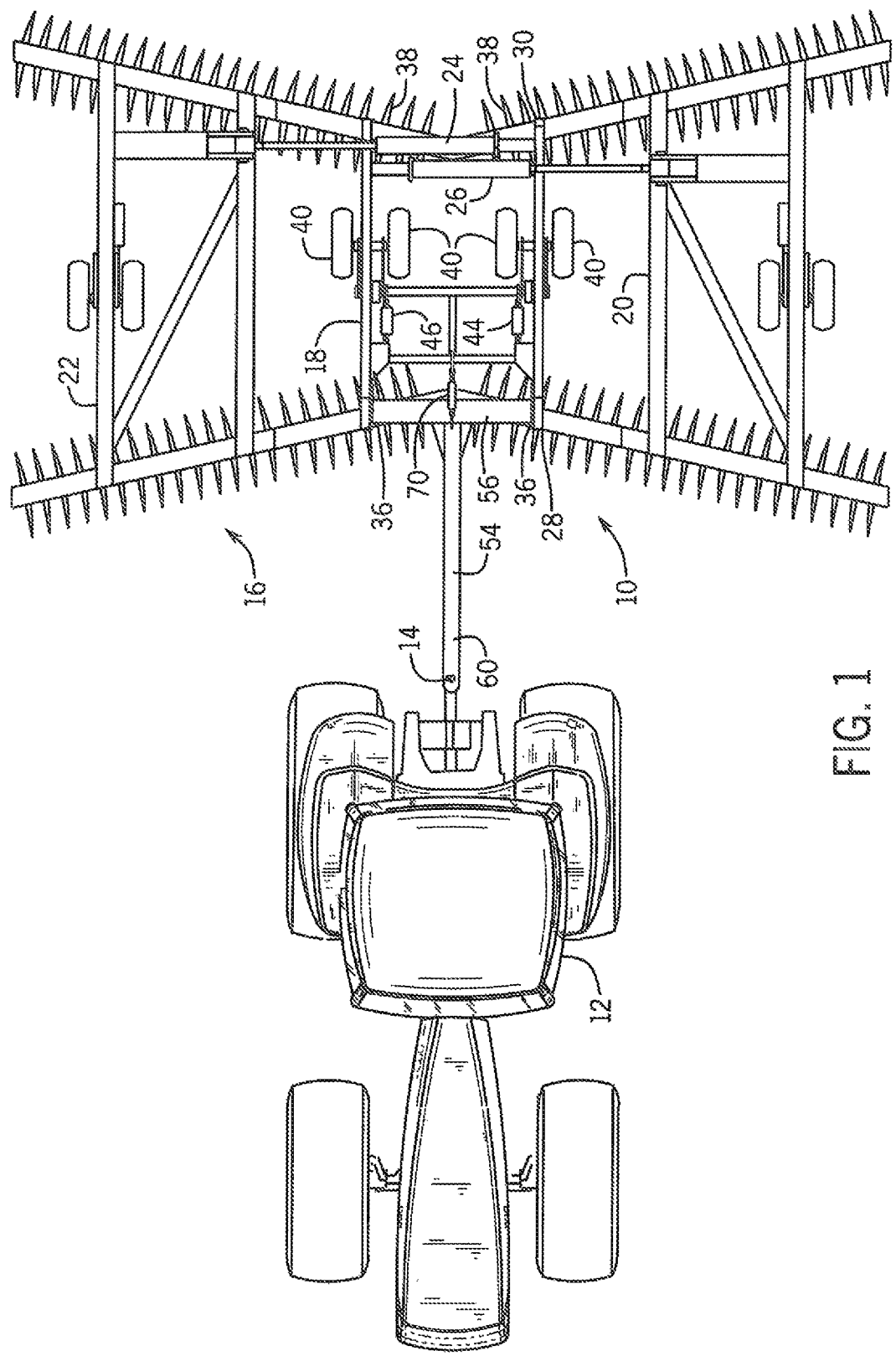
FIG. 1 is a top view of an exemplary embodiment, according to the invention, in the form of a towable tillage implement, attached to a towing vehicle.

FIG. 1 shows an exemplary embodiment of the invention in the form of a towable tillage implement 10 attached to a towing vehicle 12 at a drawbar 14 of the towing vehicle 12. More specifically, FIG. 1 shows an exemplary embodiment of the invention in the form of a tandem agricultural disk 10, attached to a tractor 12 at the tractor drawbar 14. The exemplary embodiment of the disk 10 also incorporates elements of a system for adjusting fore/aft trim of a frame 16 of the disk 10, according to an exemplary embodiment of a method for practicing the invention.

As shown in FIG. 1, the frame 16 of the exemplary embodiment of the tandem disk 10 is an assembly that includes a centrally located main frame 18, and left and right wing frames 20, 22. The left and right wing frames 20,22 are pivotably attached to the main frame 18 in a manner that allows the wing frames 20,22 and tillage tools and wing support wheels attached to the wing frames 20,22 to be folded above the main frame 18 by hydraulic cylinders 24, 26 to facilitate movement of the disk 10 from one field to another.

Figure 2:
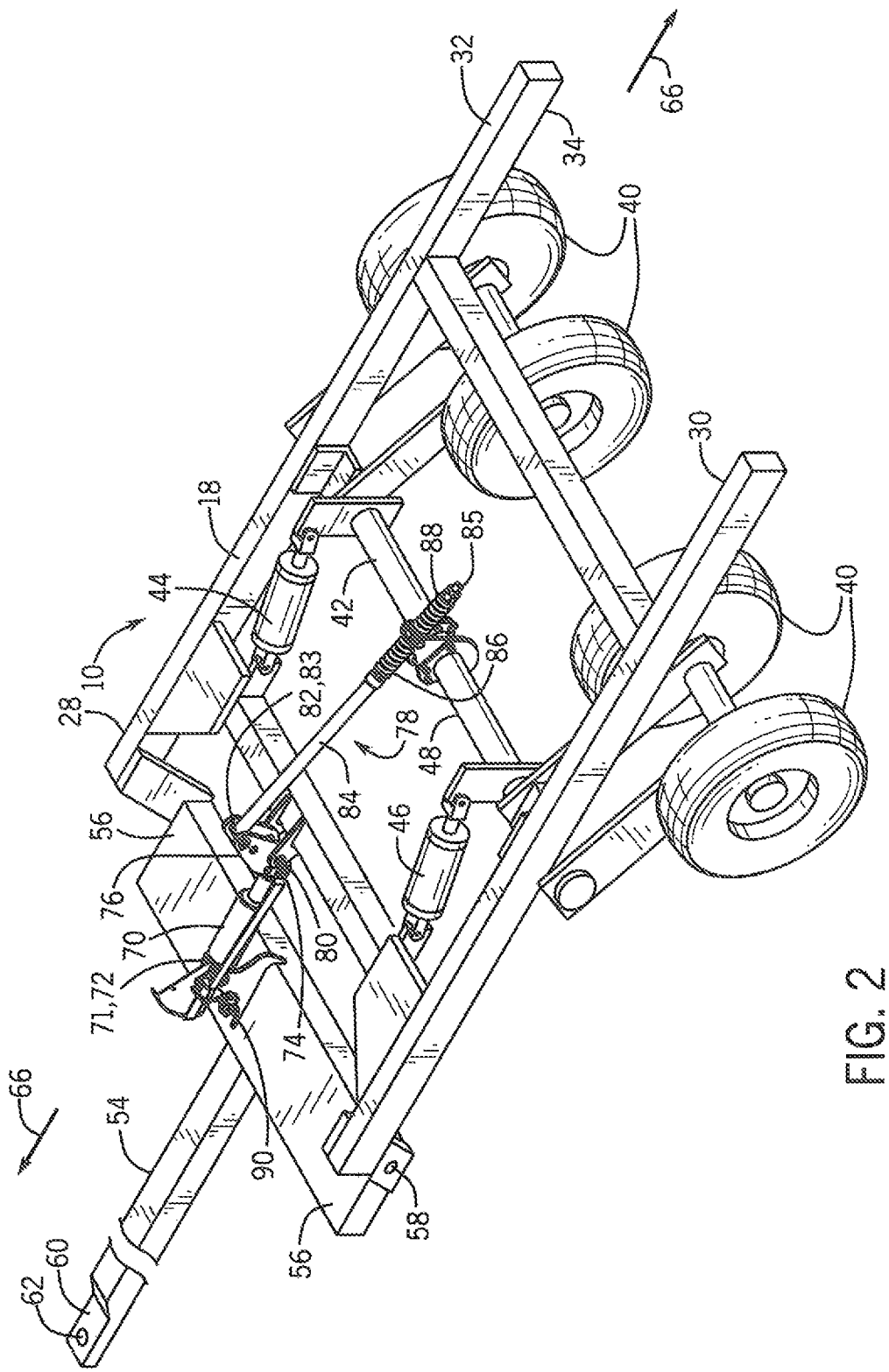
FIG. 2 is an isometric view of a main frame of the implement of FIG. 1, and selected components of the implement mounted on or attached to the main frame.
Figure 3:
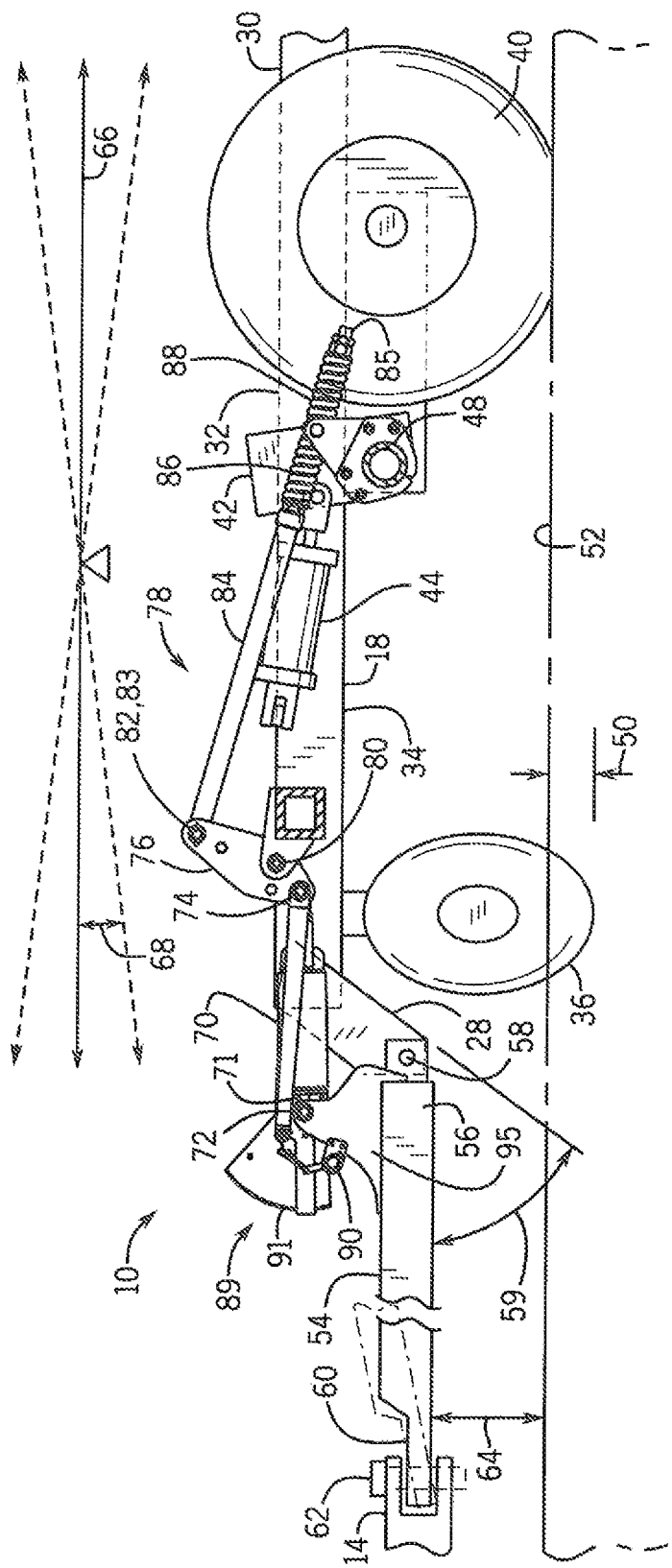
FIG. 3 is a side view of the main frame of FIG. 2, with some elements of the frame and selected components cut away to better illustrate aspects of the invention.

As shown in FIGS. 1-3, the main flume 18 defines forward and aft ends 28,30, and upper and lower surfaces 32,34 of the main frame 10. Center sections of front and rear gangs of tillage tools 36,38 are respectively attached to the forward and aft ends 28,30 of the main frame 18. In the exemplary embodiment of the implement 10, the front and rear tillage tools are disks, but it will be understood that in other embodiments of the invention the tillage tools could take other forms. For clarity of illustration, the tillage tools 36,38 are not shown in FIG. 2, and only the front tillage tool 36 is illustrated in FIG. 3.

As shown in FIGS. 1-3, the exemplary embodiment of the disk 10 includes four ground support wheels 40 operatively attached to the main frame 18 by a depth adjusting arrangement 42, that includes a pair of depth adjusting actuators in the form of hydraulic cylinders 44,46. The depth adjusting cylinders 44,46 are operatively attached at opposite ends thereof between the main frame 18 and a rock shaft 48 of the depth adjusting arrangement 42, in such a manner that extension and retraction of depth adjusting cylinders 44,46 causes the depth adjusting arrangement to raise and lower the main frame 18, to thereby adjust the depth of penetration 50 below the surface 52 of the ground under the disk 10.

As shown in FIGS. 1-3, the exemplary embodiment of the disk 10 also includes a disk hitch 54 having an aft end 56 thereof that is pivotably attached to the forward end 28 of the main frame 18, as indicated at 58. As shown in FIG. 3, this pivotable attachment allows the main frame 18 and the hitch 54 to be pivoted with respect to one another about the pivot axis 58, through a pivot angle 59, as shown in FIG. 3. As will be understood from the description below, the pivot angle 59 is indicative of the fore/aft trim angle 68 of the frame 18, and is used in some embodiments of the invention for detecting and controlling the fore/aft trim angle 68 of the frame 18. The hitch 54 also has a distal end 60 that is adapted for attachment to the tractor drawbar 14, as indicated at 62, at a drawbar height 64 above the ground surface 52. Attachment of the hitch 54 in this manner allows the main frame 18, and the wing frames 20,22 attached to the mainframe 18 to be tilted along a fore/aft axis 66 in the manner illustrated schematically in FIGS. 2 and 3 to adjust a fore/aft trim angle 68 of the main frame 18 and consequently to adjust the fore/aft trim angle 68 of the entire frame 16.

A fore/aft trim angle adjusting actuator 70 is operatively connected between the main frame 18 and the hitch 54 in such a manner that the main frame 18 can be tilted along the fore/aft axis 66, to thereby adjust the fore/aft trim of the mainframe 18 for setting the main frame 18 at a desired degree of fore/aft trim angle 68. In the exemplary embodiment, the fore/aft trim angle adjusting actuator 70 is a hydraulic cylinder, but in other forms of the invention other types of linear or rotary actuators, such as an electrically operated linear actuator or a motor could be utilized.

As shown in FIGS. 2 and 3, the fore/aft trim angle adjusting actuator 70 of the exemplary embodiment is operatively attached between the main frame 18 and the hitch 54 in a manner that, allows the fore/aft trim actuator 70 to perform a dual function. Specifically, one end of the fore/aft trim cylinder 70 is pivotably attached to the hitch 54 as indicated at 72. The other end 74 of the fore all trim cylinder 70 is pivotably attached to an articulated arm 76 of a hitch flexing arrangement 78 that allows the hitch 54 and main frame 18 to flex to a limited degree about the pivotable attachment 58 between the hitch 54 and the main frame 18, so that the disk 10 can better follow the terrain while traversing hills or valleys in the ground surface 52. The articulated aim 76 has second and third pivotable connections 80,82 to the main frame 18 and a forward end 83 of a longitudinally extending control rod 84. The opposite end 85 of the control rod 84 is attached to the rock shaft 48 of the depth adjusting arrangement 42 with a pair of springs 86,88 that allow the limited pivotable movement about the pivotable attachment 58 joining the front of the main frame 18 to the aft end 56 of the hitch 54. With this arrangement, the fore/aft trim adjusting cylinder 70 serves as a passive link in the hitch flexing arrangement 78, in addition to its primary function of providing adjustment of the fore/aft trim angle 68 through extension and retraction of the cylinder 70. It will be appreciated that in other embodiments of the invention the fore/aft trim adjustment actuator 70 may be operatively attached between the main frame 18 and the hitch 54 in a different manner, and not as part of a hitch flexing arrangement.

As shown in FIGS. 2-5, the exemplary embodiment of the disk 10 includes a trim angle position sensor 90 operatively connected between the hitch 54 and main frame 18 for detecting a present value of the pivot angle 59 between the frame 18 and the hitch 54 that is indicative of a present, value of the fore/aft trim angle 68 of the frame, and providing an electrical output in the form of a present trim angle signal 103 that is indicative of the present fore/aft trim angle 68 of the main frame 18. It will be appreciated that, for a given hitch height 64, and depth 50, geometry of the disk components will result in a constant relationship being established between the pivot angle 59 and the fore/aft trim angle 68 of the disk frame 18. This relationship is advantageously utilized in some embodiments of the invention to provide a measurement of present fore/aft trim angle 68 in a manner that is more straightforward than methods relying on other types of sensors, such as inclinometers, sonar, proximity sensors, or gauge wheels, etc., for determining and controlling the fore/aft trim angle 68.

Figure 5:
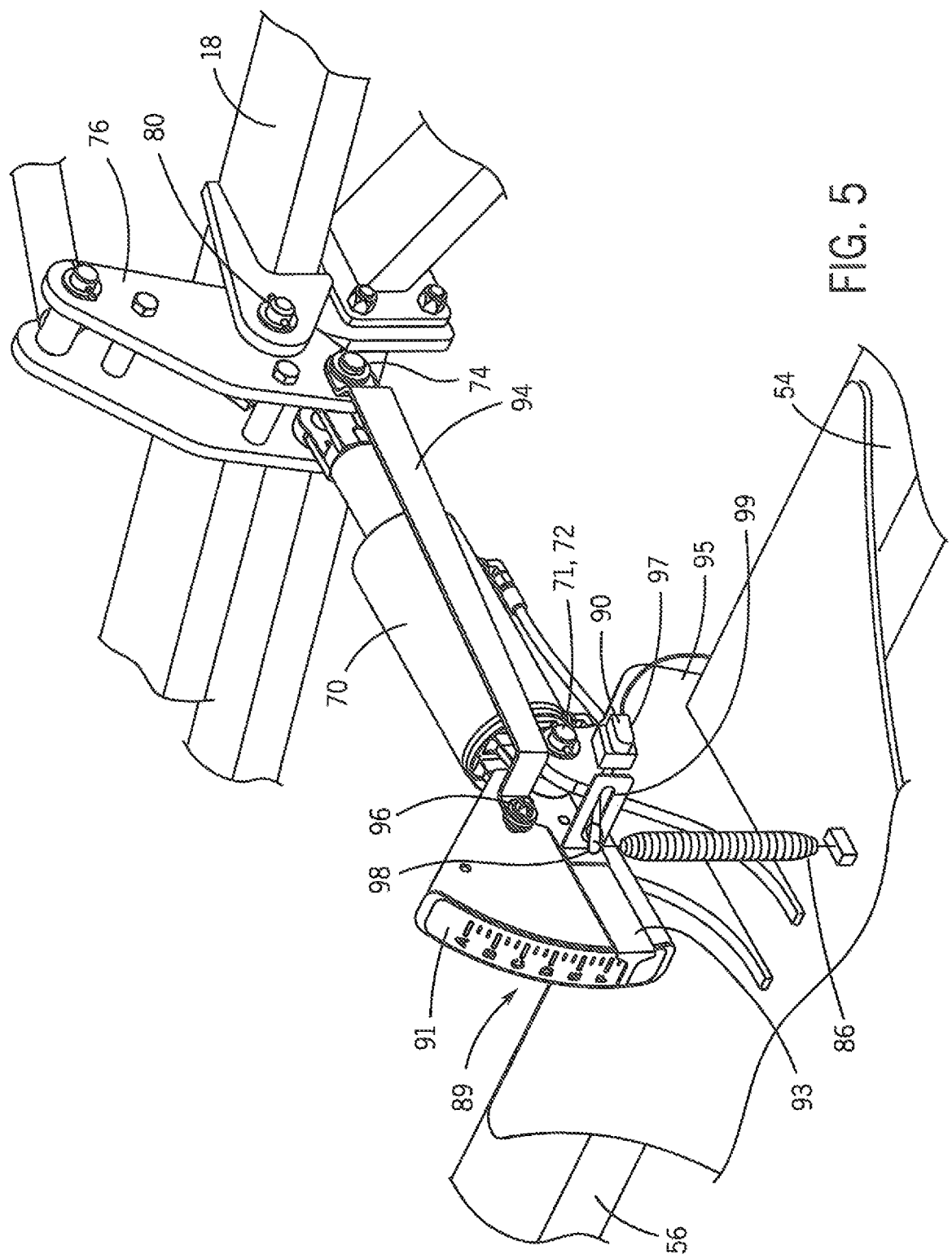
FIG. 5 is an isometric view showing details of a fore/aft position sensor mounting of the implement of FIG. 1.

As shown in FIGS. 3 and 5, in the exemplary embodiment of the invention, the trim angle position sensor 90 is integrated into a trim angle gauge arrangement 89, that includes a trim angle gauge dial 91, a trim angle gauge pointer 93, and a trim angle gauge link 94. The trim angle gauge dial and pointer 91,93 are both mounted at their aft ends on a common pin 71 that attaches the forward end of the trim angle cylinder 70 to the aft the 56 of the hitch 54, as indicated at 72 in FIG. 3. More specifically, the forward end of the cylinder 70, and the aft ends of the trim angle gauge dial and pointer 91,93 are all attached to a hair of mounting ears 95 extending upward from the aft end 56 of the hitch 54 by the common pin 71. The cylinder 70 and the pointer 93 are freely pivotably attached to the mounting, ears 95 of the hitch 53 for pivoting movement about the pin 71. The aft end of the trim angle gauge dial 91 is fixed to the forward end of the trim angle cylinder 70 to pivot about the pin 71 with the forward end of the cylinder 70, in such a manner that the dial 91 is held in a fixed alignment with an extension axis 73 of the trim angle cylinder 70.

As further shown in FIGS. 3 and 5, the aft end of the trim angle gauge link 94 is pivotably attached, together with the aft end of the trim angle cylinder 70, to attachment point 74 of the articulated arm 76 of the hitch flexing arrangement 78. The forward end of the trim angle gauge link 94 is pivotably attached to the aft end of the trim angle gauge pointer 93 at a location 96 that is offset from the point of attachment 72 to the cylinder 70 and ears 95, in such a manner that the gauge link 94 causes the pointer 93 to move with respect to the gauge dial 91 as the cylinder 70 is extended and retracted. The dial 91 is calibrated to provide a visual indication of the fore/aft trim angle 68 of the frame 18, and whether the aft end 30 of the frame 18 is raised or lowered with respect to the forward end 28 of the frame 18.

The fore/aft trim angle sensor 90, in the exemplary embodiment, is a rotary potentiometer having a body 97 attached to a bracket of one of the mounting ears 95 extending upward from the aft end 56 of the hitch 54. A rotatable input arm 98 of the potentiometer 90 operatively engages a slot 99 in the pointer 93 in such a manner that as the pointer 93 moves with respect to the dial 91, the rotatable input arm 98 is rotated, through interaction with the slot 99 in the pointer 93, to thereby generate the electrical signal 103 that is indicative of the present trim angle 68 of the main frame 18. The exemplary embodiment illustrated in FIG. 5 also includes a tension spring 118 extending from the distal end of the input arm 98 to the aft end 56 of the hitch 54, to facilitate tracking of the input arm 98 in the slot 99.

It will be appreciated that in practicing the invention, other arrangements for providing the present trim angle signal are contemplated, within the scope of the invention. For example, it is not necessary in practicing the invention to have the trim angle sensor 90 integrated into a trim angle gauge arrangement 89, in the manner described above. In some embodiments of the invention, the trim angle sensor 90 may be located at an alternate position on the implement 10, for detecting the pivot angle 59 between the frame 18 and the hitch 54 about the pivot axis 58. In some embodiments of the invention, the trim angle sensor functionality may be incorporated into the trim angle actuator 70, by utilizing a so-called "smart actuator" that includes an integral sensor for detecting a present stroke length of the actuator that is indicative of the present fore/aft trim angle 68 of the frame 18.

Figure 4:
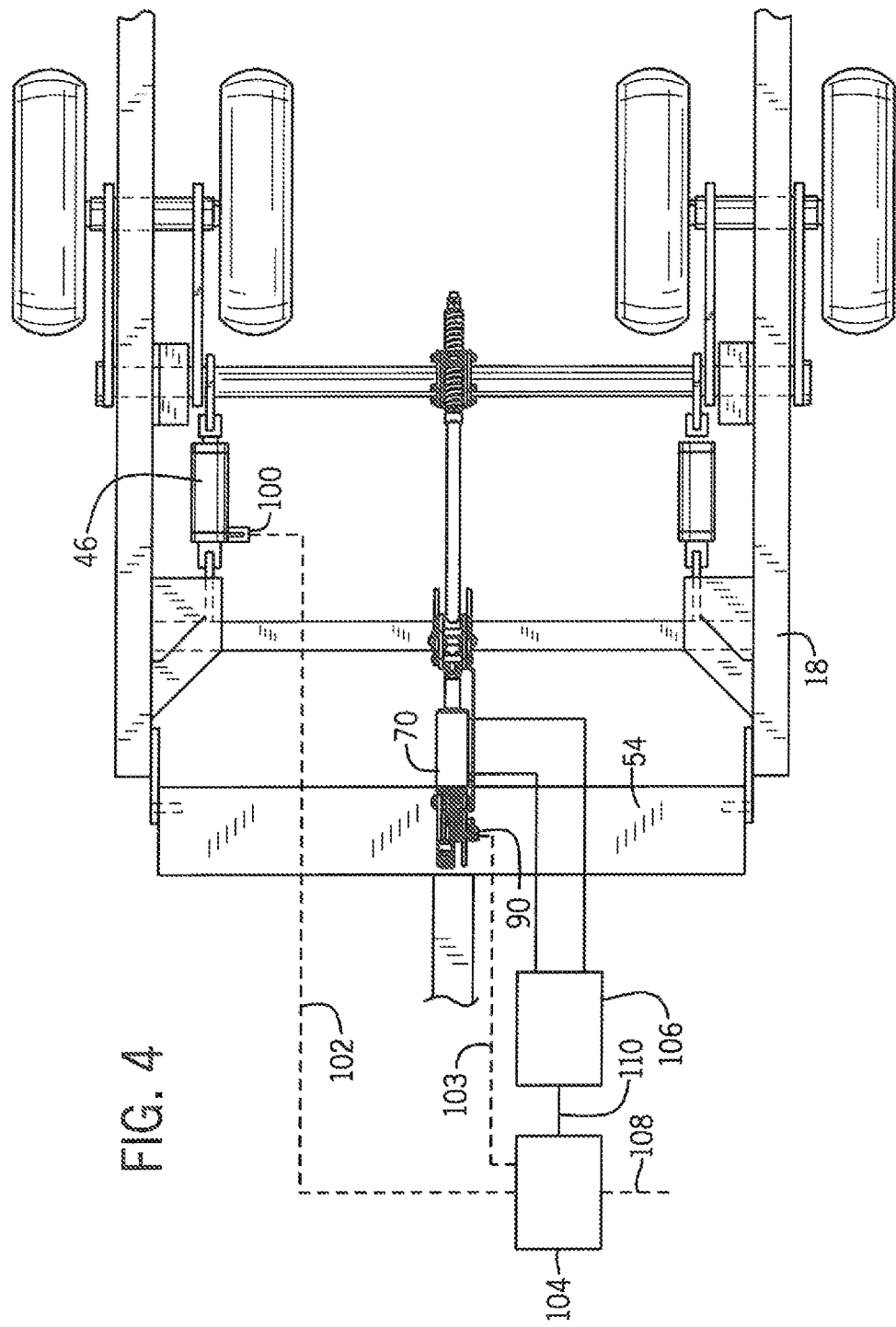
FIG. 4 is a top, partially schematic, view of the main frame of FIG. 2. Showing the location and connections of control elements of the invention.

As shown in FIG. 4, one of the depth control cylinders 46 includes a cylinder extension sensor that serves as a depth sensor 100, providing an output electrical present depth signal 102 that is indicative of a present depth of penetration 50 of the tillage tools 36,38 below the surface of the ground 52. It will be appreciated that in other embodiments of the invention other types of depth sensing arrangements may be attached to an implement for sensing depth in a different manner. In the exemplary embodiment, the degree of extension of the depth cylinders 44,46 is directly proportional to the operation of the depth adjusting, arrangement 42, and therefore provides a continuous indirect measurement of present depth of penetration 50 of the tillage tools 36,38.

As shown in FIG. 4, the exemplary embodiment of the disk 10, and a system and method of adjusting fore/aft trim angle 68 of the main frame 18, also include a fore/aft trim angle control unit 104, and a trim angle adjustment power source 106. The trim angle adjustment power source 106 in the exemplary embodiment 10 is an electrically controlled hydraulic power source operatively connected to supply hydraulic fluid to the fore/aft trim angle adjustment cylinder 70 in response to electrical control signals 110 received from the fore/aft trim angle control unit 104.

The control unit 104 of the exemplary embodiment is an electronic controller that is operatively connected by wires, or wirelessly, to the fore/aft trim position sensor 90 and the depth sensor 100, to respectively receive the present trim angle signal 103 and the present depth signal 102. The control unit 104 is configured to also receive a desired depth input 108, from an operator of the disk 10, indicating a desired depth of penetration 50 of the tillage tools 36,38 below the ground surface 52. The control unit is further configured to provide a control signal 110 to the fore/aft trim angle adjustment power source 106, corresponding to the desired depth input 108, for automatically driving the fore/aft trim angle cylinder 70 to tilt the main frame 18 along the fore/aft trim axis 66 and thereby change the trim angle 68 of the frame 18 from present trim value corresponding to the present depth 50 to a new present value of trim angle 68 corresponding to the desired depth input 108.

In some embodiments of the invention, the control unit 104 is configured to select a predetermined new fore/aft trim angle 68 corresponding to the desired depth input 108, from predetermined values of fore/aft trim angle as a function of desired depth stored in memory within the control unit 104. For example, if the operator indicates that he desires a depth 50 of three inches, the control unit will search its memory and retrieve a predetermined fore/aft trim angle 68 corresponding to a desired depth of three inches, and send an appropriate control signal 110 to the fore/aft trim angle power source 106 to drive the main frame 18 to the new trim angle 68 corresponding, to the desired depth input 108.

In some embodiments of the invention, the control unit 104 is configured to calculate a new trim angle 68 corresponding, to a desired depth input 108, rather than using predetermined new trim angles stored in memory of the control unit 104. Some embodiments of a control unit 104, according to the invention, are configured such that the operator can input an incremental change in desired depth from a present depth 50 of penetration of the tillage tools 36,38, which the control unit 104 will use to calculate a new trim angle 68 corresponding to the desired incremental change. For example, an operator may input a desired incremental change to reduce the desired depth by one inch from its present depth of penetration 50. If the disk 10 was set at a present depth 50 of four inches when the incremental change was inputted to the control unit 104, the control unit 104 would compute a new desired trim angle corresponding to three inches of depth 50 and the fore/aft trim system 18 would automatically drive the fore/aft trim actuator 70 to tilt the mainframe to the proper trim angle 68 for the new desired depth of three inches, without any further input or action by the operator.

It is contemplated that in a system, apparatus or method, according to the invention, the inputs from the operator, and functionality of the control unit may utilize aspects of modern farm equipment, such as an ISOBUS, or other applicable technology such that the operator may utilize the invention for automatically adjusting fore/aft trim of a towable tillage implement while positioned in the cab of the towing vehicle.

It will be understood that the present invention may he utilized to automatically trim for/aft levelness of a towable tillage implement in a more convenient manner than has heretofore been possible, by eliminating the need for the repetitive, iterative approaches used in the past that typically required manual adjustments of fore/aft trim by the operator, and in some instances required the assistance of a second person. The invention also allows far greater freedom and flexibility in fine tuning the fore/aft trim of the towable implement, in the field, and essentially on-the-fly during operation of the implement. Whereas prior approaches to fore/aft leveling were essentially limited to maintaining an implement frame in a single, horizontally level or other trim condition set during an initial set-up operation, the invention allows the fore/aft trim of an implement to be adjusted in the field to utilize trim angles other than the one set in the initial set-up, so that the trim angle may be continually fine-tuned to whatever angle works best in a given field condition.

From the foregoing description of exemplary embodiments, those having skill in the art will readily appreciate that the invention provides significant advantages over prior approaches to adjusting fore/aft trim of a towed tillage implement.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may be apparent to those having skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. It is specifically noted that, although the description herein was directed to practice of the invention in a towed agricultural implement, the invention is not limited to practice only in agricultural tillage equipment.

We claim:

1. A system for adjusting fore/aft trim in a towed implement having a frame defining forward and aft ends and upper and lower surfaces thereof, front and rear tillage tools attached respectively to the forward and aft ends of the frame, ground support wheels operatively attached to the frame by a depth adjusting arrangement that includes a depth adjustment actuator for adjusting a depth of penetration of the front and rear tillage tools below a ground surface, a hitch having an aft end thereof pivotably attached to the forward end of the frame and a distal end thereof adapted for attachment at a drawbar height to a towing vehicle, with the aft end of the hitch being pivotably attached to the frame in a manner allowing the frame to be pivoted through a pivot angle with respect to the hitch for tilting the frame along the fore/aft axis to thereby adjust fore/aft trim of the frame, the fore/aft trim adjustment system comprising:

a fore/aft trim angle adjusting actuator operatively attached between the hitch and the frame for tilting the frame at a trim angle along the fore/aft axis;

a trim angle adjustment power source operatively attached to the fore/aft trim actuator for driving the trim actuator to adjust the trim angle;

a trim angle position sensor operatively attached between the hitch and the frame for detecting a present value of the pivot angle between the frame and the hitch that is indicative of a present value of the fore/aft trim angle, and providing an electrical output in the form of a present trim angle signal indicative of the present fore/aft trim angle of the frame;

a depth sensor operatively attached to the implement for indicating a present depth of penetration of at least one of the front and rear tillage tools, and providing an electrical output in the form of a present depth signal indicative of the present depth of penetration of the at least one tillage tool; and a control unit operatively connected to the depth sensor and the trim angle sensors for respectively receiving the electrical present depth and present trim angle signals therefrom;

the control unit also being operatively connected to the trim angle adjustment power source to provide control thereof for selectively driving the trim angle actuator to tilt the frame along the fore/aft axis to thereby change the present fore/aft trim angle of the frame;

the control unit being further configured for receiving a desired depth input and controlling the trim angle actuator to provide a desired fore/aft trim angle of the frame corresponding to the desired depth input signal.

2. The system of claim 1, wherein the control unit selects a predetermined trim angle corresponding to the desired seedbed depth input and controls the trim angle actuator power source using the predetermined trim angle.

3. The system of claim 1, wherein the control unit computes a desired trim angle corresponding to the desired depth input and controls the trim angle actuator power source using the computed trim angle.

4. The system of claim 3, wherein the desired depth input is an incremental adjustment to a present depth of penetration.

5. The system of claim 1, wherein the trim angle adjusting actuator is a hydraulic cylinder, and the trim angle adjusting power source is an electrically controlled hydraulic power source.

6. The system of claim 1, wherein the trim angle adjusting actuator is an electrically driven linear actuator cylinder, and the trim angle adjusting power source is an electrical power source.

7. A towable tillage implement for engaging and acting upon a ground surface under the implement, the tillage implement comprising:
  a frame defining forward and aft ends and upper and lower surfaces thereof;
  front and rear tillage tools attached respectively to the forward and aft ends of the frame; ground support wheels operatively attached to the frame by a depth adjusting arrangement that includes a depth adjustment actuator for adjusting a depth of penetration of the front and rear tillage tools below the ground surface;
  a hitch having an aft end thereof pivotably attached to the forward end of the frame and a distal end thereof adapted for attachment at a drawbar height to a towing vehicle, with the aft end of the hitch being pivotably attached to the frame in a manner allowing the frame to be pivoted through a pivot angle with respect to the hitch for tilting the frame along the fore/aft axis to thereby adjust fore/aft trim of the frame;
  a fore/aft trim angle adjusting actuator operatively attached between the hitch and the frame for tilting the frame at a trim angle along the fore/aft axis;
  a trim angle adjustment power source operatively attached to the fore/aft trim actuator for driving the trim actuator to adjust the trim angle;
  a trim angle position sensor operatively attached between the hitch and the frame for detecting a present value of the pivot angle between the frame and the hitch that is indicative of a present value of the fore/aft trim angle, and providing an electrical output in the form of a present trim angle signal indicative of the present fore/aft trim angle of the frame;
  a depth sensor operatively attached to the implement for indicating a present depth of penetration of at least one of the front and rear tillage tools, and providing an electrical output in the form of a present depth signal indicative of the present depth of penetration of the at least one tillage tool; and
  a control unit operatively connected to the depth sensor and the trim angle sensors for respectively receiving the electrical present depth and present trim angle signals therefrom;
    the control unit also being operatively connected to the trim angle adjustment power source to provide control thereof for selectively driving the trim angle actuator to tilt the frame along the fore/aft axis to thereby change the present fore/aft trim angle of the frame;
    the control unit being further configured for receiving a desired depth input and controlling the trim angle actuator to provide a desired fore/aft trim angle of the frame corresponding to the desired depth input signal.

8. The implement of claim 7, wherein the control unit selects a predetermined trim angle corresponding to the desired seedbed depth input and controls the trim angle actuator power source using the predetermined trim angle.

9. The implement of claim 7, wherein the control unit computes a desired trim angle corresponding to the desired depth input and controls the trim angle actuator power source using the computed trim angle.

10. The implement of claim 9, wherein the desired depth input is an incremental adjustment to a present depth of penetration.

11. The implement of claim 7, wherein the trim angle adjusting actuator is a hydraulic cylinder, and the trim angle adjusting power source is an electrically controlled hydraulic power source.

12. The implement of claim 11, wherein the hydraulic cylinder defines a present cylinder stroke, and the trim angle position sensor indicates the present trim angle by detecting a present absolute position of the present cylinder stroke.

13. The implement of claim 7, wherein the trim angle adjusting actuator is an electrically driven linear actuator, and the trim angle adjusting power source is an electrical power source.

14. The implement of claim 13, wherein the electrically driven linear actuator defines a present stroke length thereof, and the trim angle position sensor indicates the present trim angle by detecting a present absolute position of the present linear actuator stroke.

* * * * *